United States Patent
Ono et al.

(10) Patent No.: US 7,162,144 B1
(45) Date of Patent: Jan. 9, 2007

(54) DATA RECORDING APPARATUS, MEDIUM AND INFORMATION PACKAGE

(75) Inventors: Tadashi Ono, Kyotanabe (JP); Tatsuro Juri, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 896 days.

(21) Appl. No.: 09/692,312

(22) Filed: Oct. 20, 2000

(30) Foreign Application Priority Data

Oct. 21, 1999 (JP) .................................. 11-300220

(51) Int. Cl.
*H04N 5/93* (2006.01)
*H04N 5/91* (2006.01)

(52) U.S. Cl. .......................................... 386/52; 386/46

(58) Field of Classification Search .................. 386/1, 386/45, 46, 125, 126, 52, 55, 94, 96, 97, 386/95, 105, 106, 83; 358/908; 380/203, 380/239; 382/100; *H04N 5/93, 5/91*
See application file for complete search history.

(56) References Cited

U.S. PATENT DOCUMENTS

| | | | | |
|---|---|---|---|---|
| 6,052,242 A | * | 4/2000 | Hirata | 360/15 |
| 6,160,950 A | * | 12/2000 | Shimazaki et al. | 386/46 |
| RE37,052 E | * | 2/2001 | Park | 380/203 |
| 6,434,322 B1 | * | 8/2002 | Kimura et al. | 386/94 |
| 6,700,989 B1 | * | 3/2004 | Itoh et al. | 382/100 |
| 2001/0019659 A1 | * | 9/2001 | Hirai | 386/83 |

FOREIGN PATENT DOCUMENTS

| | | |
|---|---|---|
| EP | 0 926 866 A1 | 12/1999 |
| JP | 11-176083 | 7/1999 |
| JP | 11-249819 | 8/1999 |

OTHER PUBLICATIONS

Copy of Japan Patent Office Action mailed on Jan. 24, 2006.

* cited by examiner

*Primary Examiner*—Robert Chevalier
(74) *Attorney, Agent, or Firm*—Smith, Gambrell & Russell, LLP

(57) ABSTRACT

A data recording apparatus that sequentially input: data configured in units that cannot be recorded across different files and records the data in a file having a predetermined volume, has: size detecting unit for deciding when data is sequentially recorded in file, whether next unit of the data to be recorded can be fully recorded in the same file, or not; file creation controlling unit for recording said next data to be recorded in another file or stopping recording if the case where the result of the decision by said size detecting unit shows that recording is not possible; and file writing unit for writing data in a file according to the control from said file creation controlling unit.

14 Claims, 8 Drawing Sheets

DATA RECORDING APPARATUS, MEDIUM AND INFORMATION PACKAGE

BACKGROUND OF THE INVENTION

1. Field of the Invention

The present invention relates to a data recording apparatus that captures data to be continuously processed such as video data or voice data into a computer, converts the data to a file and records it in a recording medium such as a hard disk.

2. Related Art of the Invention

Capturing video data recorded in a video camera, etc. into a computer and converting it in an animation file is called "image capturing." A typical example of formatting of this image captured animation file is an AVI file handled by the Windows operating system.

With commercialization of the IEEE1394 interface and increasing-capacity of hard disk drives in recent years, it is now possible to handle relatively low-compression rate video data such as DV (Digital Video) as an AVI file.

As a result, it is possible to easily capture a high-quality animation recorded in a DV format into a computer and to edit it by software without deterioration of image quality.

However, handling an AVI file involves the following problems:

(1) The maximum capacity of one file handled by Windows is $2^{31}$ bytes ("^" denotes power), that is, 2 GB. On the contrary, video data in a DV format which is suitable for NTSC format of present TV signal is 120,000 bytes per 1 frame and so when DV data is captured, only data for approximately 9 minutes can be captured even if there is an enough space in the hard disk. Thus, a problem arises that if one file becomes full, subsequent image data must be abandoned. Furthermore, even if the data spilling out of the file is stored in another file, when it is stored in the other file in the middle of a frame, that is, one frame is recorded on different areas noise can occur in the reproduced data.

(2) Furthermore, an animation or voice mode in an AVI file format must be unique within one file. For example, mode information that indicates a voice mode includes a sampling frequency and the sampling frequency must be constant in one AVI file.

On the contrary, it is known that in a DV format, three types of voice sampling frequency of 48 kHz, 44.1 kHz and 32 kHz are mixed within one file and a mixture of these three may exist on one tape. Therefore, if such animation is captured in a conventional AVI file format, a problem arises that that when reproduced, the stored data may include noise.

(3) Furthermore, since animation and voice data converted to an AVI file are digital data, the copyright issue should be taken into account. Generally, an AVI file contains copyright information that means the file (1) can be reproduced any number of times (COPY FREE), (2) can be reproduced only one time (COPY FREE) or (3) cannot be reproduced (COPY NEVER or COPY NO MORE). Capturing or reproducing animation ignoring this copyright information is not permitted. However, when data is converted to an AVI file conventionally, a problem arises that copyright is not taken into account enough.

(4) Furthermore, when the remaining recording capacity of a recording area (normally partition) becomes 0 during capturing, a problem arises that that no more video data can be recorded. Even if the remaining data is recorded in another recording area, when the recording area is switched in the middle of a frame, that is, one frame is recorded on different areas, a problem arises that that noise can be generated when the data is reproduced.

SUMMARY OF THE INVENTION

In view of these problems it is an object of the present invention to provide a data recording apparatus or the like capable of recording data correctly.

The $1^{st}$ invention of the present invention is a data recording apparatus that sequentially inputs data configured in units that cannot be recorded across different files and records the data in a file having a predetermined volume, comprising:

size detecting means for deciding when data is sequentially recorded in file, whether next unit of the data to be recorded can be fully recorded in the same file, or not;

file creation controlling means for recording said next data to be recorded in another file or stopping recording if the case where the result of the decision by said size detecting means shows that recording is not possible; and file writing means for writing data in a file according to the control from said file creation controlling means.

The $2^{nd}$ invention of the present invention is a data recording apparatus that records data in a file comprising:

detecting means for detecting a change of a property attached to said data;

file recording controlling means for recording data in said plurality of files or stopping recording according to said change of the property; and file writing means for writing data in a file according to the control from said file creation controlling means.

The $3^{rd}$ invention of the present invention is a data recording apparatus that records data in a file comprising:

detecting means for detecting a change of a property attached to said data;

file recording controlling means for converting the property of said data to the previous property and recording data in said file when said detecting means detects a change of the property; and file writing means for writing data in a file according to the control from said file creation controlling means.

The $4^{th}$ invention of the present invention is a data recording apparatus that records data inputted in file units in another file, comprising:

detecting means for detecting the type of a property attached to said data;

file recording controlling means for when said detecting means detects a plurality of types of property in one file, converting and unifying properties of all data that belongs to the file to a property of one of the plurality of types of property and recording the data in a new file; and file writing means for writing data in a file according to the control from said file creation controlling means.

The $5^{th}$ invention of the present invention is a data recording apparatus that sequentially inputs data configured in units that cannot be recorded across different recording areas and records the data as a file in a recording area having a predetermined volume, comprising:

size detecting means for deciding when data is sequentially recorded in the recording area whether next unit of the data to be recorded can be fully recorded in the same recording area, or not;

file creation controlling means for recording said next data to be recorded in another recording area or stopping recording if the result of the decision by said size detecting means shows that recording is not possible; and file writing means for writing data in a file according to the control from said file creation controlling means.

DESCRIPTION OF SYMBOLS

Figure 1:
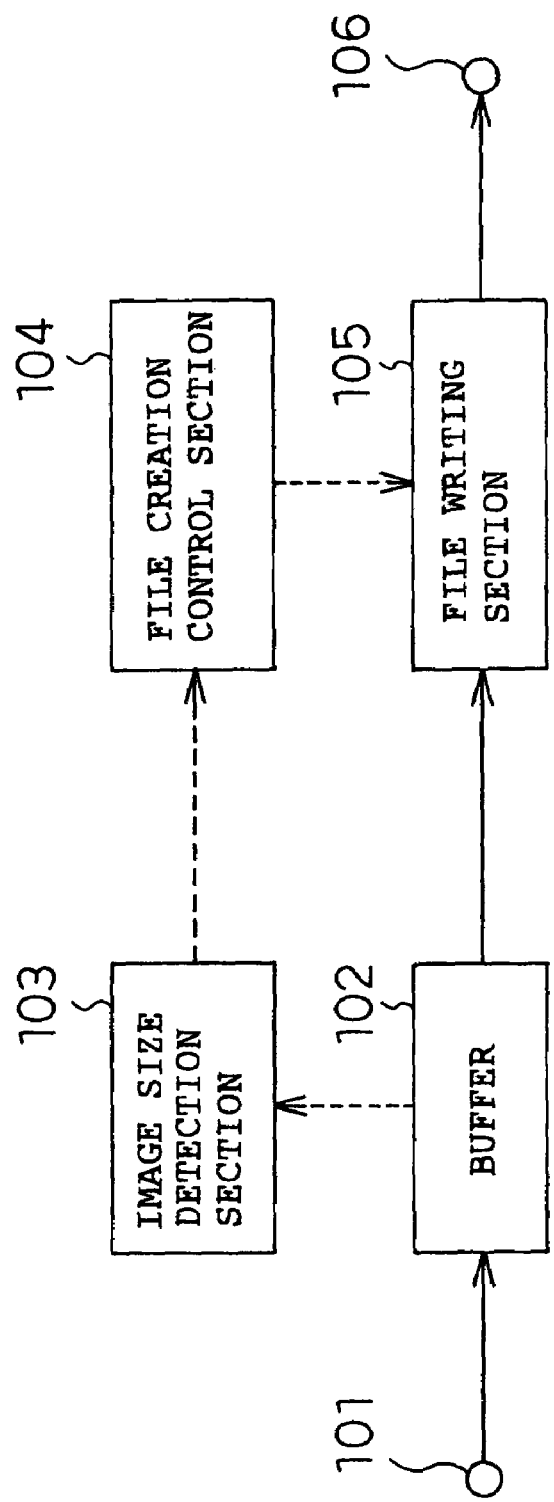
FIG. 1 is a block diagram of a data capture apparatus according to a first embodiment of the present invention.

101 Input section
102 Buffer
103 Image size detection section
104 File creation control section
105 File writing section
106 Output section
201 Image mode information detection section
301 Voice mode information detection section
401 Switch
402 Voice mode conversion section
501 Copyright information detection section
502 Switch
503 Copyright information conversion section
601 Image mode information detection section
602 Buffer
603 Image mode conversion section
701 Recording area residual quantity detection section
702 File creation control section
801 Image mode information detection section
802 Image mode conversion section

PREFERRED EMBODIMENTS OF THE INVENTION

Referring to the attached drawings, embodiments of the present invention will be described below. In the following description of embodiments, explanations of the blocks already explained will be omitted.

First Embodiment

FIG. 1 illustrates a configuration of a data capture apparatus according to a first embodiment of the present invention. In FIG. 1, reference numeral 101 denotes an input section; 102, a buffer; 103, an image size detection section; 104, a file creation control section; 105, a file writing section; and 106, an output section.

Now, the operation of the first embodiment will be described with reference to FIG. 1. In this embodiment, suppose an upper limit of a file size, that is, a total size is 2 GB.

Animation data inputted from the input section 101 is stored in the buffer 102 in frame units. The animation size detection section 103 detects a frame number (1, 2, ..., K; K: positive integer) of frame-unit video data stored in the buffer 102 and size of each frame (frame size). The animation size detection section 103 also calculates the total size, which accumulates frame sizes in the frame number order. Analyzing the header section of the DV data format makes it possible to know the frame size, etc.

When capturing of animation is started, the file creation control section 104 instructs the file writing section 105 to open file A, which is a file preset for data recording to convert the video data to a file. However, as described above, the total size of file A is set to be 2 GB or less.

Then, the file writing section 105 writes the video data stored in the buffer 102 in the frame number order as far as the total size of file A, that is, 2 GB is exceeded.

Then, in the image size detection section 103, if it is found that the total size (total size up to the image data of frame number N) of 2 GB will be exceeded if the image data of frame number N is written additionally, this means that the size of file A exceeds 2 GB. Thus, the image size detection section 103 notifies the file creation control section 104 of excessive total size information.

It is also possible to notify of the excessive total size information if a comparison result shows that the Nth data is bigger than such difference between the total size of up to the (N−1)th data and 2 GB.

Upon receipt of the excessive total size information, the file creation control section 104 instructs the file writing section 105 to close file A and to open file B, which is a file for recording new video data, even if file A is not full. The file writing section 105 closes file A in which the video data of up to frame number (N−1) is recorded and opens file B.

Furthermore, the file writing section 105 outputs file A that has been closed just before from the output section 106. At this time, the total size is cleared to zero and image data from frame number N onward is recorded in file B.

The above operations are repeated and when all video data stored in the buffer 102 is written, the file creation control section 104 instructs the file writing section 105 to close the file in which the last video data is written. The file writing section 105 closes the file above and outputs it from the output section 106.

The information that the next file of the data that belongs to file A is file B, etc. is retained as an index table, which makes it possible to easily reproduce continuous image data, or the like.

As shown above, when recording data in a file, this embodiment can capture even high bit rate image data for a long time exceeding 2 GB without omissions.

This embodiment prevents data that belongs to one frame from being stored in different files separately in frame units. In the case of MPEG, for example, using GOP as a unit it is also possible to prevent data that belongs to one GOP from being stored in different files separately. In short, the present invention can be applied to cases where data pieces configured in units whose data should not be recorded in more than one separate file are recorded sequentially and such units can also be anything in addition to the above frame or GOP.

Moreover, when the data of the next unit is likely to exceed the file capacity, it is also possible to stop recording.

This is because in this way it is possible to prevent incomplete data less than 1 frame or 1 GPO from remaining in a file.

Second Embodiment

Figure 2:
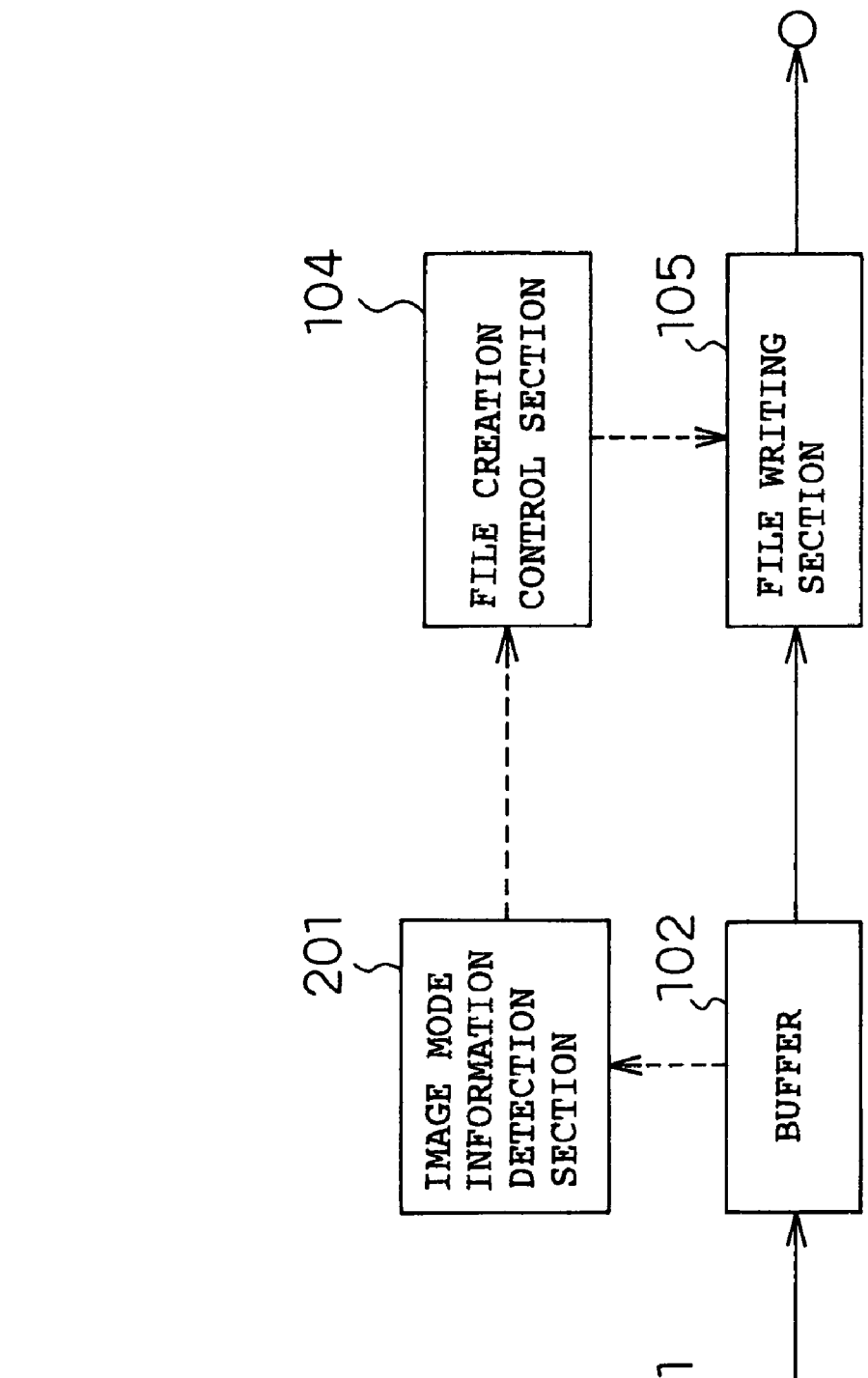
FIG. 2 is a block diagram of a data capture apparatus according to a second embodiment of the present invention.

FIG. 2 illustrates a configuration of a data capture apparatus according to a second embodiment of the present invention. In FIG. 2, reference numeral 201 is an image mode information detection section.

Now, the operation of the second embodiment will be described with reference to FIG. 2.

As in the case of the first embodiment, video data input from the input section 101 is stored in the buffer 102 in frame units. An image mode information detection section 201 acquires the image mode information entered. However, in this embodiment, suppose the image mode information at the start of capturing is of an SDTV system. This image mode information is stored, for example, in the header section in a DV format.

When capturing of animation is started, the file creation control section 104 instructs the file writing section 105 to open file A, which is a file preset for data recording in order to convert the images to a file. The file writing section 105 writes the video data stored in the buffer 102 in file A as long as it confirms that the image mode information is of an SDTV system.

Then, when the image mode information detection section 201 finds, for example, that the image mode information owned by the video data of frame number N is of an HDTV system, the image mode information detection section 201 notifies the file creation control section 104 of image mode change information, which is information indicating a change of the image mode information.

Upon receipt of the image mode change information, the file creation control section 104 instructs the file writing section 105 to close current file A and open file B, which is a file for recording new video data. The file writing section 105 closes file A in which the SDTV-based video data of up to frame number N−1 is recorded and opens file B. Furthermore, the file writing section 105 outputs file A that has been closed just before from the output section 106.

Hereafter until the image mode information is changed again, HDTV-based image data is written in this file B.

When the above operations are repeated and all video data stored in the buffer are written, the file creation control section 104 instructs the file writing section 105 to close the file in which the last video data is written. The file writing section 105 closes the file above and outputs it from the output section 106.

As shown above, this embodiment can capture video data in different signal modes into different files without omissions.

This embodiment describes the case of SDTV and HDTV as examples of image mode information. In addition to these, the actual image mode information also includes parameters such as frame frequency, encode format, number of vertical lines together and it is also possible to select and use these parameters as appropriate.

When capturing image data in different signal formats, the present invention records them in different files, but can also be configured so as to stop capturing when the signal format changes. This can prevent data having different image mode information from being stored in one file.

Third Embodiment

Figure 3:
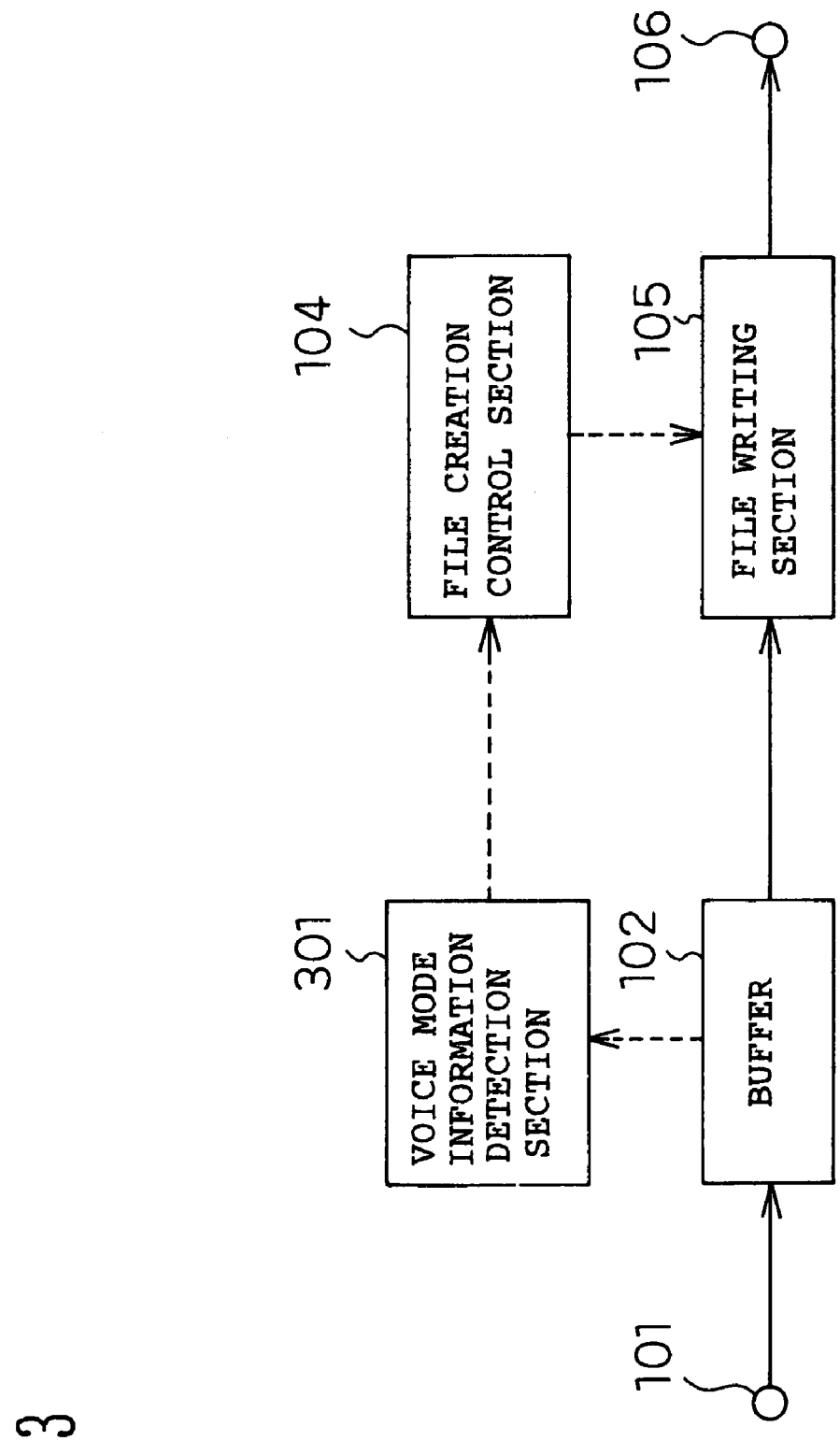
FIG. 3 is a block diagram of a data capture apparatus according to a third embodiment of the present invention.

FIG. 3 illustrates a configuration of a data capture apparatus according to a third embodiment of the present invention. In FIG. 3, reference numeral 301 denotes a voice mode information detection section.

The operation of the third embodiment will be described with reference to FIG. 3 below.

Animation data with voice is input from the input section 101 and stored in the buffer 102 in predetermined units (here, frame units). The voice mode information detection section 301 acquires the voice mode information of the image data entered. However, in this embodiment, suppose the voice mode information at the start of capturing has a sampling frequency of 48 kHz.

When capturing of animation is started, the file creation control section 104 instructs the file writing section 105 to open file A, which is a file preset for data recording in order to convert the animation to a file. The file writing section 105 writes the video data stored in the buffer 102 in file A as long as its sampling frequency is 48 kHz.

Then, when the voice mode information detection section 301 finds, for example, that the voice sampling frequency, which is the voice mode information owned by the video data with voice of frame number N, has changed from 48 kHz to 32 kHz, the voice mode information detection section 301 notifies the file creation control section 104 of voice mode change information, which is information indicating a change of the voice mode information.

Upon receipt of the voice mode change information, the file creation control section 104 instructs the file writing section 105 to close current file A and open file B, which is a file for recording new video data. The file writing section 105 closes file A in which the video data with voice of a voice sampling frequency of 48 kHz of up to frame number N−1 is recorded and opens file B. Furthermore, the file writing section 105 outputs file A that has been closed just before from the output section 106.

Hereafter until the voice sampling frequency is changed again, image data including voice data of 32 kHz is written in file B.

When the above operations are repeated and all image data stored in the buffer is written, the file creation control section 104 instructs the file writing section 105 to close the file in which the last video data with voice is written. The file writing section 105 closes the file above and outputs it from the output section 106.

As shown above, this third embodiment can capture image data with voice into different files without data omissions even if the voice mode changes in the middle of capturing.

This third embodiment describes the sampling frequency as an example of voice mode information. The actual voice mode information also includes parameters such as number of bits per one sound element, number of channels and voice invalid information together and it is also possible to select and use these parameters as appropriate.

Fourth Embodiment

Figure 5:
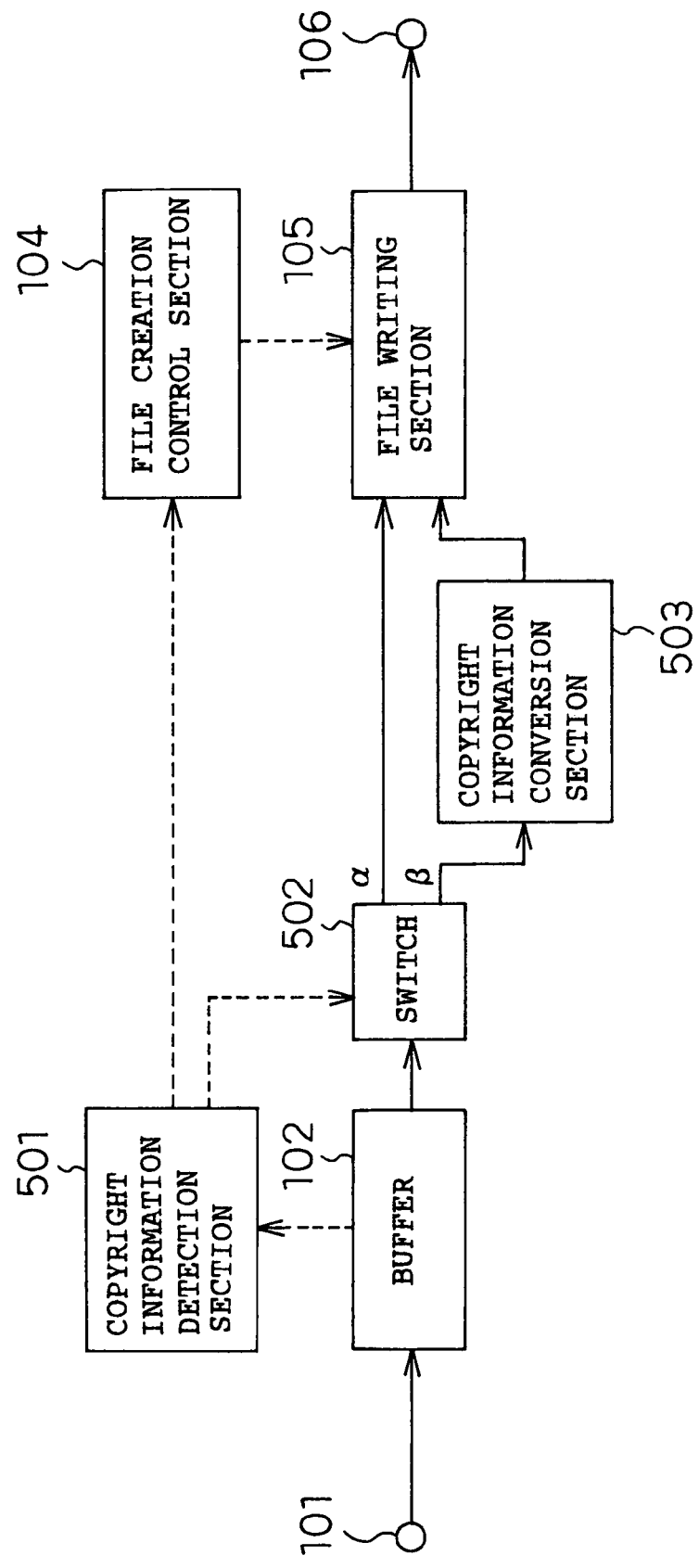
FIG. 5 is a block diagram of a data capture apparatus according to a fourth embodiment of the present invention.

FIG. 5 illustrates a configuration of a data capture apparatus according to a fourth embodiment of the present invention. In FIG. 5, reference numeral 501 denotes a copyright information detection section, reference numeral 502 denotes a switch and reference numeral 503 denotes a copyright information conversion section.

The operation of the fourth embodiment will be described with reference to FIG. 5 below.

Animation data with copyright information is input from the input section 101 and stored in the buffer 102 in predetermined units (here, frame units). The copyright information detection section 501 acquires the copyright information of the image data entered. For example, the copyright information exists in the auxiliary data section in a DV format.

Here, suppose there are three types of copyright information in this embodiment; (A) COPY FREE, (B) COPY ONCE, and (C) COPY NEVER or COPY NO MORE.

First, when the copyright information acquired is (A) or (B), that information is notified to the file creation control section 104 and the file creation control section 104 instructs the file writing section 105 to open file A, which is a file preset for data recording in order to convert the images to a file. On the other hand, when the copyright information is (C), since the captured file is a reproduction of the relevant image data, the file writing section 105 performs no capturing, closes file A and finishes operation.

Then, when the acquired copyright information is (A) or (B), the video data stored in the buffer 102 is output via the switch 502. At this time, if the copyright information of the first video data is (A), the switch 502 selects the output on the a side. In this case, the video data is supplied to the file writing section 105 as is and written in file A. This operation is repeated as long as the copyright information is (A).

Furthermore, if in the copyright information detection section 501, for example, the copyright information owned by the video data of frame number N or the copy right in formation owned by the each frame, is changed to (B), the copyright information detection section 501 supplies copyright information change information, which is information indicating a change of the copyright information to the file creation control section 104.

Upon receipt of the copyright information change information, the file creation control section 104 instructs the file writing section 105 to close current file A and open file B, which is a file for recording new video data. The file writing section 105 closes file A in which the video data of up to frame number N−1 whose copyright information is (A) is recorded and opens file B.

The copyright information change information is also supplied to the switch 502. When the copyright information becomes (B), the switch 502 selects the output on the β side. At this time, the video data having the copyright information (B) is supplied to the copyright information conversion section 503. The copyright information conversion section 503 rewrites the copyright information owned by the video data from (B) to (C). This is the processing performed because capturing the relevant animation corresponds to one-time reproduction and the copyright information is converted from (B) to (C) in order to prohibit further reproductions.

In the copyright information conversion section 503, the video data whose copyright information has been converted from (B) to (C) is written by the file writing section 105 in file B. Furthermore, when image information with copyright information (C) is input from the input section 101, the copyright information detection section 501 notifies the file creation control section 104 of the copyright information change information and the file creation control section 104 instructs the file writing section 105 to immediately close the file. The file writing section 105 closes the file and outputs it from the output section 106.

As shown above, when image data including copyright information is captured and the copyright information is changed, the fourth embodiment of the present invention records the data in another file or stops capturing. This prevents different type of copyright information from existing in one file, eliminating the need to perform complicated copy protection operations. Furthermore, when the copyright information is of a type with one-time permission of reproduction, this embodiment can prohibit further files from being reproduced by writing the copyright information in a file with reproduction prohibited.

Fifth Embodiment

Figure 4:
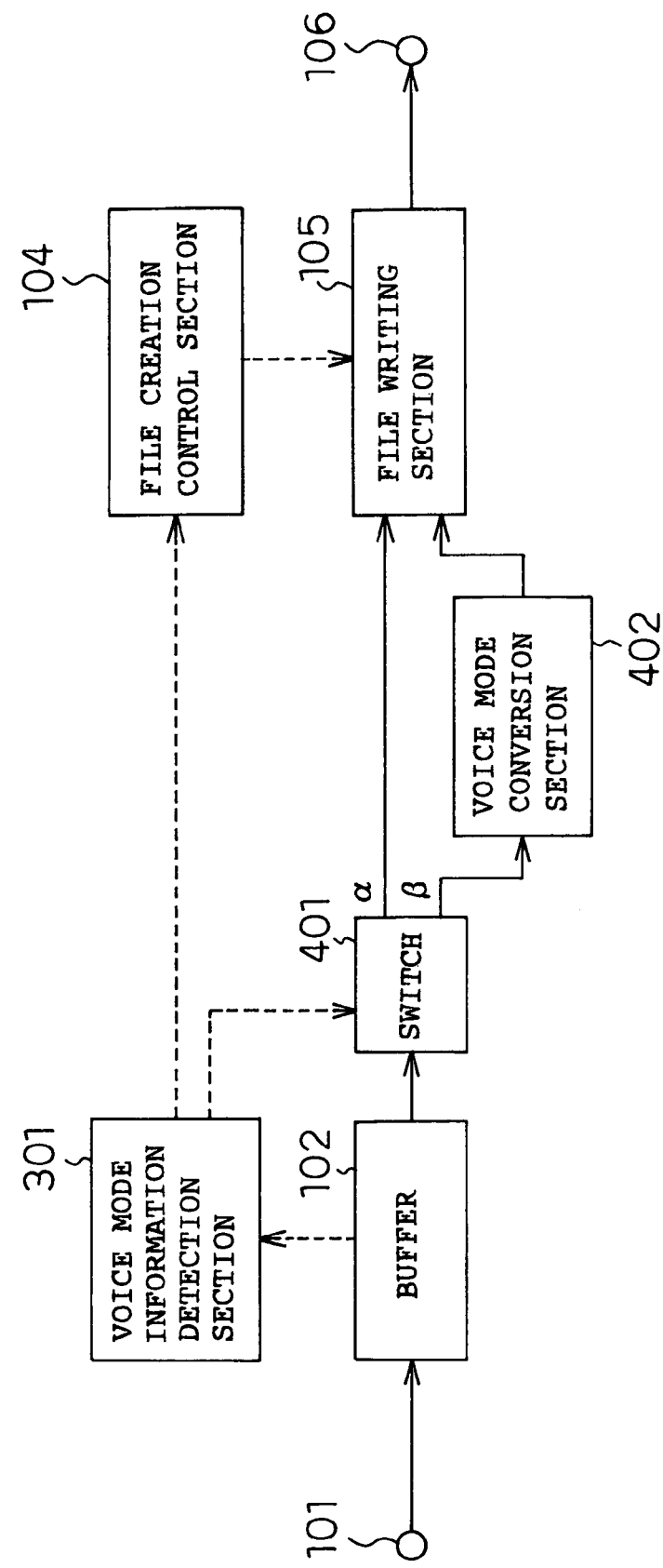
FIG. 4 is a block diagram of a data capture apparatus according to a fifth embodiment of the present invention.

FIG. 4 illustrates a configuration of a data capture apparatus according to a fifth embodiment of the present invention. In FIG. 4, reference numeral 401 denotes a switch and reference numeral 402 denotes a voice mode conversion section.

The operation of the fifth embodiment will be described with reference to FIG. 4 below. Animation data with voice is input from the input section 101 and stored in the buffer 102 in predetermined units (here, frame units). The voice mode information detection section 301 acquires the voice mode information of the video data entered. Here, in this embodiment, suppose the number of bits per 1 sound element of the video data is 16 bits at the beginning of capturing and this voice mode information is retained as initial voice mode information in the voice mode information detection section 301.

When capturing of the animation is started, the file creation control section 104 instructs the file writing section 105 to open file A, which is a file preset for data recording in order to convert the images to a file.

Next, the video data stored in the buffer 102 is output via the switch 401. At this time, if the voice mode information owned by the video data to be recorded matches the initial voice mode information, the switch 401 selects the output on the α side.

In this case, the video data of the buffer 102 is written by the file writing section 105 with no conversion.

On the other hand, if the voice mode information owned by the video data does not match the initial voice mode information, if, for example, the number of bits per one sound element is 8 bits, the switch 401 selects the output on the β side. At this time, the voice data of the buffer 102 is supplied to the voice mode information conversion section 402. In this embodiment, the voice mode information conversion section 402 converts voice data of 8 bits per 1 sound element entered to 16 bits and supplies it to the file writing section 105. For example, the voice mode information conversion section 402 converts the voice data by up-converting and then filtering it.

As shown above, when the voice mode information of the first data is different from the voice mode information of the data to be written in a file, this embodiment converts data to the voice mode information of the first data, making it possible to record data having the same voice mode information in one file.

If the case where the voice mode information is a sampling frequency, this embodiment converts the sampling frequency using an appropriate filter.

Figure 8:
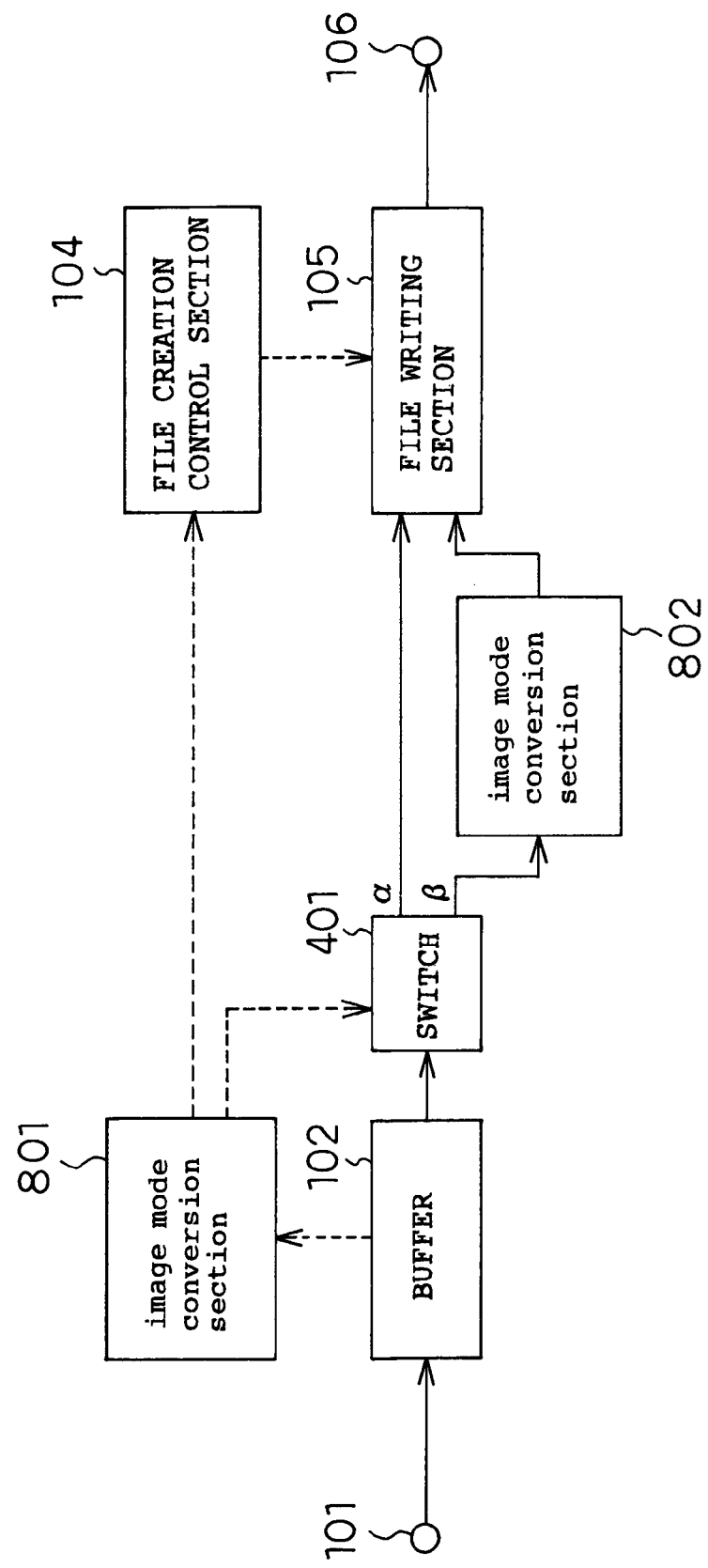
FIG. 8 is a block diagram of a data capture apparatus according to a modification example of the fifth embodiment of the present invention.

The embodiment above describes the case where processing is carried out only on voice data. However, as shown in FIG. 8, it is also possible to handle the aforementioned image mode information instead of the voice mode information. That is, using the image mode conversion section 801 instead of the voice mode information detection section 401 and using the image mode conversion section 802 instead of the voice mode information detection section 402, it is possible to convert video data and continuously record the video data with the same image mode information in one file.

Sixth Embodiment

Figure 6:
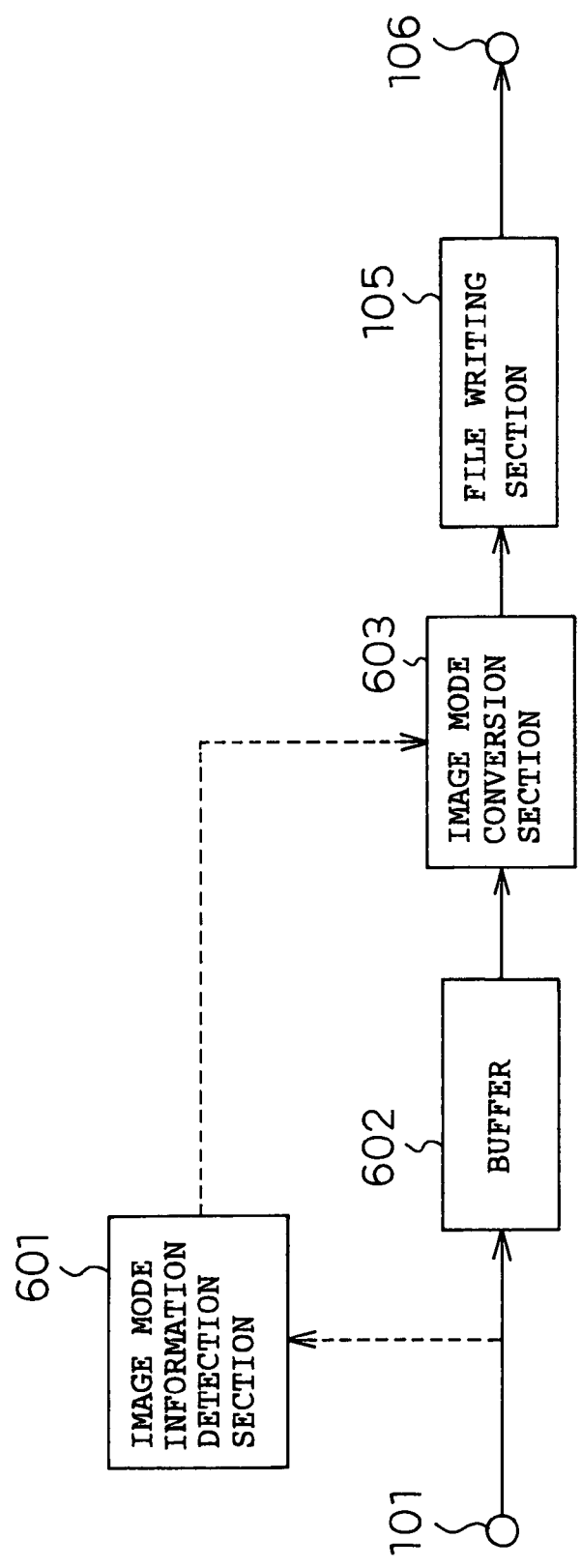
FIG. 6 is a block diagram of a data capture apparatus according to a sixth embodiment of the present invention.

FIG. 6 illustrates a configuration of a data capture apparatus according to a sixth embodiment of the present invention. In FIG. 6, reference numeral 601 denotes an image mode information detection section, reference numeral 602 denotes a buffer and reference numeral 603 denotes an image mode conversion section.

The operation of the sixth embodiment will be described with reference to FIG. 6 below.

For video data with image mode information input from the input section 101, the image mode information detection section 601 acquires image mode information in frame units. Suppose this data entered has already been converted to a file as already described in the first to fifth embodiments. Animation data is retained in the buffer 602, which has a sufficiently large capacity.

When capturing of the video data corresponding to at least one file is completed, if the case where the image mode information detected by the image mode information detection section 601 is of a predetermined type, the video data is not directly converted by the image mode conversion section 603, but the file writing section 105 writes the data in a file directly and outputs it from the output section 106.

On the other hand, if the type of the image mode detected by the image mode information detection section 601 is other than a predetermined type, the image mode conversion section 603 converts the video data to data of the predetermined type.

The file writing section 105 writes this data in a file and outputs it from the output section 106.

As described above, this embodiment can provide one unified type of image mode.

If the case where a plurality of types of image mode is included targeted at properties such as the above described voice mode information instead of this image mode information, it is also possible to unify those types to any one type so that only one property is present in one file.

What this embodiment differs from the fifth embodiment is as follows. That is, in the fifth embodiment, of a plurality of types of property, the properties are unified to the property appearing first, while in this embodiment, properties only need to be unified to any one type of properties. For example, properties can be unified to the property appearing last in one file.

Seventh Embodiment

Figure 7:
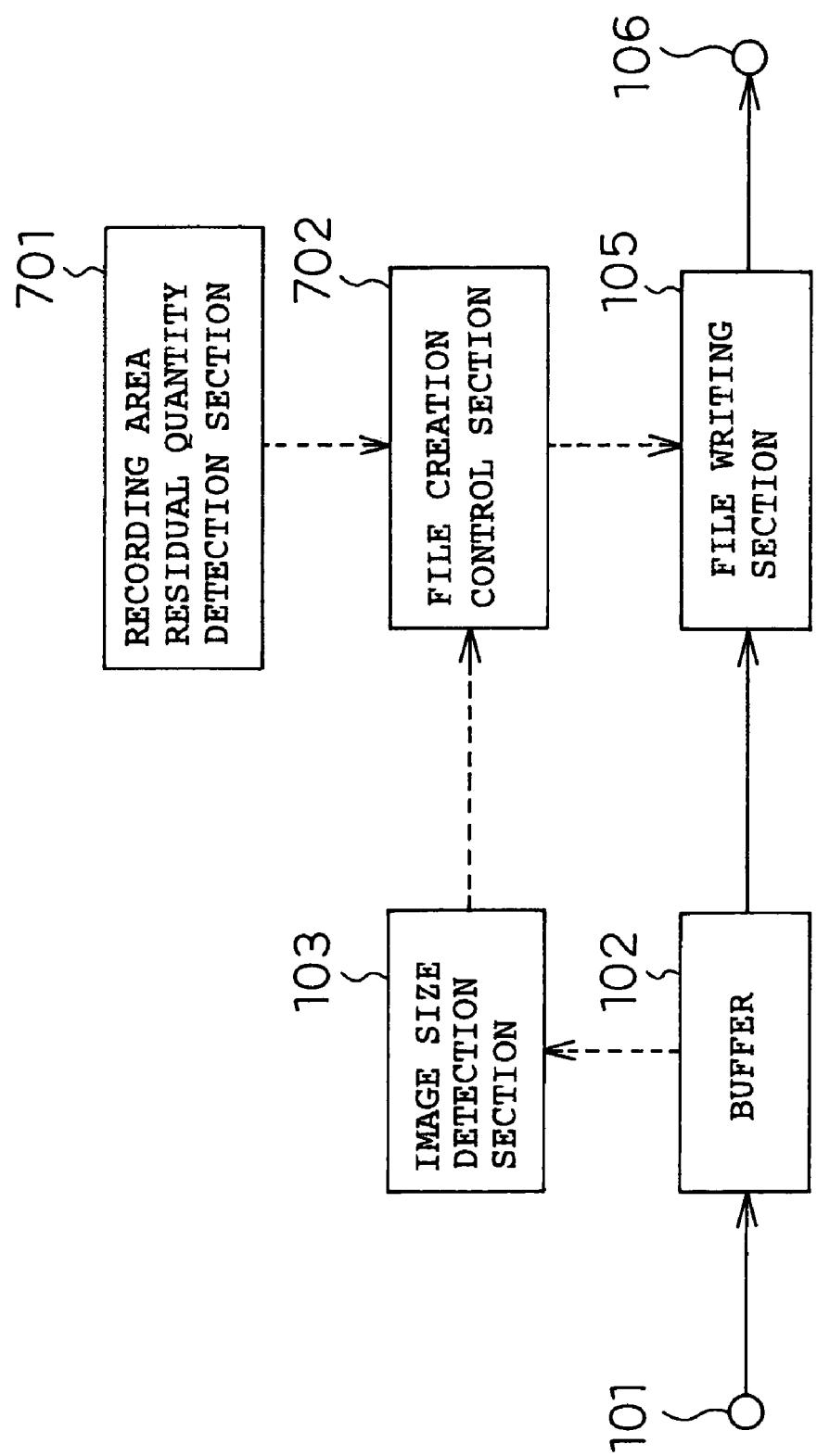
FIG. 7 is a block diagram of a data capture apparatus according to a seventh embodiment of the present invention.

FIG. 7 illustrates a configuration of a data capture apparatus according to a seventh embodiment of the present invention. In FIG. 7, reference numeral 701 denotes a recording area residual quantity detection section and reference numeral 702 denotes a file creation control section.

The operation of the seventh embodiment will be described with reference to FIG. 7 below.

The video data input from the input section 101 is stored in the buffer 102 in frame units. The animation size detection section 103 detects the frame number (1, 2, . . . , K; K: positive integer) of frame-unit video data stored in the buffer 102 and its size (frame size). The animation size detection section 103 further calculates the total size, which accumulates frame sizes in the frame number order.

When capturing of animation is started, the file creation control section 702 instructs the file writing section 105 to open file A, which is a file preset for data recording to convert the video data to a file.

Then, the recording area residual quantity detection section 701 detects a recording area residual quantity of the disk partition in which file A is created and supplies it to the file creation control section 702.

The file writing section 105 writes the video data stored in the buffer 102 in the frame number order unless the total size of file A exceeds the detected recording area residual quantity.

Then, if the case where the image size detection section 103 finds, for example, that the total size will exceed the recording area residual quantity if the image data of frame number N is written additionally, this means that the video data cannot be recorded as a single file in the disk partition in which file A exists. Thus, the image size detection section 103 notifies the file creation control section 702 of excessive total size information. Upon receipt of the excessive total size information, the file creation control section 702 instructs the file writing section 105 to close file A and open file B, which is a file for recording new video data in another recordable disk partition. The file writing section 105 closes file A in which the video data of up to frame number (N−1) is recorded and opens file B. Furthermore, the file writing section 105 outputs file A that has been closed just before from the output section 106. At this time, the total size is cleared to zero and image data from frame number N onward is recorded in file B.

Furthermore, the recording area residual quantity detection section 701 detects a recording area residual quantity of the disk partition in which file B is created and supplies it to the file creation control section 702.

When the above operations are repeated and all video data stored in the buffer is written, the file creation control section 702 instructs the file writing section 105 to close the file in which the last video data is written. The file writing section 105 closes the file above and outputs it from the output section 106.

As shown above, when recording data in a file and capturing video data into a recording area whose recording area residual quantity is small, this embodiment can capture even high bit rate image data for a long time without data omissions.

Of course, as explained in the first embodiment, it is also possible to target at units such as GOP in which data should not be recorded in different recorded areas instead of frames, so as to prevent data from being split.

In this embodiment, when there is no recordable disk partition, recording is stopped.

This embodiment can also be configured in such a way as to detect the residual quantity of the recording area of a disk partition and the amount of video data corresponding to one sequence to be recorded before writing the data in a file and recreate the file in another disk partition if the first is smaller than the latter. This is because when one sequence is split into two disk partitions, it is more difficult to reproduce the joint section seamlessly and it becomes more complicated to copy, move a file, etc. Therefore, the sequence here is a set of data, which is preferable to be put together in one file. In the case of MPEG, for example, it is a GOP unit and in the case of DV, it is one frame.

In the embodiments described above, file recording is controlled using information such as a file size and voice mode information as individual indices, but it is also possible to control file recording using a combination of a plurality of these indices.

The detecting means of the present invention corresponds to the image mode information detection section 201, the voice mode information detection section 301, the copyright information detection section 501 and image mode information detection section 601 of the embodiments above and the file recording controlling means of the present invention corresponds to the file creation control section 104.

The embodiments of the present invention are described assuming that a file like file B in which video data is written from file A in which the first video data is recorded onward has been preset in the file writing section 105, but these files can also be newly created as occasion arises.

Furthermore, the above embodiments are targeted at a capture apparatus to capture AV images into a computer, but the present invention is not limited to this and can also be applied to a recording apparatus handling data other than AV images.

The present invention is a medium carrying programs and/or data to make a computer execute all or some functions of all or some means of the present invention and is a medium that can be read by the computer and that allows the programs and/or data read above to function together with the computer to execute the functions above.

Furthermore, the present invention is an information package that is a program and/or data to make a computer execute all or some functions of all or some means above of the present invention and is an information package that can be read by the computer and that allows the program and/or data read above to function together with the computer to execute the functions above.

Here, the "data" includes a data structure, data format and type of data, etc.

The "medium" includes recording medium such as ROM, transmission medium such as the Internet and transmission medium such as light, radio wave and sound wave.

The "medium carrying data" includes, for example, a recording medium that records a program and/or data and a transmission medium that transmits a program and/or data.

"That can be processed by a computer" means that a recording medium such as ROM can be read by a computer or that a program and/or data to be transmitted can be handled by a computer as a result of transmission in the case of a transmission medium.

The "information package" includes software such as a program and/or data.

The configuration of the present invention described above can be implemented by software or hardware.

As explained above, the present invention can record images of a video camera, etc. in a file on a computer without exceeding an upper limit of a file size or without omissions in the middle of capturing.

When the image mode, voice mode or copyright information changes, the present invention allows each file to keep one type of image mode information, voice mode information or copyright information.

What is claimed is:

1. A data recording apparatus that sequentially inputs data configured in units that cannot be recorded across different files and records the data in a file having a predetermined volume, comprising:

size detecting means for deciding when data is sequentially recorded in file, whether next unit of the data to be recorded can be fully recorded in the same file, or not;

file creation controlling means for recording said next data to be recorded in another file or stopping recording if the case where the result of the decision by said size detecting means shows that recording is not possible; and file writing means for writing date in a file according to the control from said file creation controlling means.

2. A data recording apparatus that records inputted data which should be processed sequentially in a file having a predetermined volume, comprising:

image mode information detecting means for detecting a change of an image mode information attached to said data; and file recording controlling means for controlling the recording of said data to the file;

wherein when a change of a content of the image mode information is detected by said image mode information detecting means, said file recording controlling means changes the file to record the data to another file and sequentially records the data or stops recording.

3. A data recording apparatus that records inputted data which should be processed sequentially in a file having a predetermined volume, comprising:

voice mode information detecting means for detecting a change of a voice mode information attached to said data; and file recording controlling means for controlling the recording of said data to the file;

wherein when a change of a content of the voice mode information is detected by said voice mode information detecting means, said file recording controlling means changes the file to record the data to another file and sequentially records the data or stops recording.

4. A data recording apparatus that records data in a file comprising:

detecting means for detecting a change of a property attached to said data;

file recording controlling means for converting the property of said data to the previous property and recording data in said file when said detecting means detects a change of the property; and file writing means for writing data in a file according to the control from said file recording controlling means.

5. The data recording apparatus according to claim 4, wherein said property is image mode information and said file recording controlling means converts the content of said data to the image mode information before the content is changed and records data in said file when the content of said image mode information changes.

6. The data recording apparatus according to claim 4, wherein said property is voice mode information and said file recording controlling means converts the content of said data to the voice mode information before the content is changed and records data in said file when the content of said voice mode information changes.

7. A data recording apparatus that records data inputted in file units in another file, comprising:

detecting means for detecting the type of a property attached to said data;

file recording controlling means for when said detecting means detects a plurality of types of property in one file, converting and unifying properties of all data that belongs to the file to a property of one of the plurality of types of property and recoding the data in a new file; and file writing means for writing data in a file according to the control from said file recording controlling means.

8. The data apparatus according to claim 7, wherein said property is image mode information.

9. The data recoding apparatus according to claim 7, wherein said property is voice mode information.

10. A data recoding apparatus that sequentially inputs data configured in units that cannot be recorded across different recording areas and records the data as a file in a recording area having a predetermined volume, comprising:

size detecting means for deciding when data is sequentially recorded in the recording area whether next unit of the data to be recorded can be fully recorded in the same recording area, or not;

file creation controlling means for recording said next data to be recorded in another recording area or stopping recording if the result of the decision by said size detecting means shows that recording is not possible; and file writing means for writing data in a file according to the control from said file creation controlling means.

11. A medium carrying a program and/or data to make a computer execute all or some functions of all or some means of the data recording apparatus of the present invention according to any one of claims 1, 2, 3, and 4 to 10 and that can be processed by a computer.

12. A data recoding apparatus that records the inputted data which should be processed sequentially in a file having a predetermined volume, comprising:

size detecting means for detecting a volume of the data stored in the file, and file recording control means for controlling the recording of the data to the file, wherein when the volume of the data stored in the file detected by said size detecting means exceeds said predetermined volume, said file recording control means changes the file to record the data to another file and sequentially records the data, or stops recording.

13. The data recording apparatus according to claim 2, wherein the image mode information contains at least one of an encode format, a signal format, and a frame frequency.

14. The data recording apparatus according to claim 3, wherein the voice mode information contains at least one of a sampling frequency, number of sample bits per one sound element, and voice invalid information which represents a state of silence.

* * * * *